United States Patent
Gernegross

(10) Patent No.: US 8,483,309 B2
(45) Date of Patent: Jul. 9, 2013

(54) METHOD, ARRANGEMENT AND DEVICE FOR TRANSMITTING INFORMATION BETWEEN A CENTRAL UNIT AND AT LEAST ONE DECENTRALIZED UNIT IN A COMMUNICATION NETWORK

(75) Inventor: Dietmar Gernegross, Oberhaching (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1228 days.

(21) Appl. No.: 12/295,234

(22) PCT Filed: Mar. 21, 2007

(86) PCT No.: PCT/EP2007/052676
§ 371 (c)(1),
(2), (4) Date: Oct. 28, 2008

(87) PCT Pub. No.: WO2007/113110
PCT Pub. Date: Oct. 11, 2007

(65) Prior Publication Data
US 2009/0268795 A1  Oct. 29, 2009

(30) Foreign Application Priority Data
Mar. 31, 2006  (DE) .................. 10 2006 015 055

(51) Int. Cl.
*H04B 15/00* (2006.01)
(52) U.S. Cl.
USPC ........... 375/285; 375/259; 375/295; 375/346; 379/1.01; 379/27.01; 379/31; 379/32.01; 379/32.04
(58) Field of Classification Search
USPC .............. 375/224, 225, 228, 259–260, 285, 375/295–296, 316, 346; 379/1.01, 27.01, 379/31, 32.01, 32.04
See application file for complete search history.

(56) References Cited

U.S. PATENT DOCUMENTS

| 2003/0198217 | A1* | 10/2003 | Redfern | 370/352 |
| 2004/0258000 | A1* | 12/2004 | Kamali et al. | 370/252 |
| 2005/0271075 | A1* | 12/2005 | Cioffi et al. | 370/445 |
| 2011/0026569 | A1* | 2/2011 | Belge | 375/222 |

FOREIGN PATENT DOCUMENTS

| EP | 1300964 | 4/2003 |
| EP | 1300964 A | 4/2003 |
| WO | WO 2007/008836 A | 1/2007 |
| WO | WO2007008836 | 1/2007 |

OTHER PUBLICATIONS

Jacobsen, K.S. et al., Methods of Upstream Power Backoff on Very High-Speed Digital Subscriber Lines, IEEE Communications, [online], vol. 39, No. 3, Mar. 1, 2001, pp. 210-216, XP002441084.

(Continued)

*Primary Examiner* — Chieh M Fan
*Assistant Examiner* — James M Perez
(74) *Attorney, Agent, or Firm* — Laurence A. Greenberg; Werner H. Stemer; Ralph E. Locher

(57) ABSTRACT

The invention relates to a method, an arrangement and a device for transmitting information between a central unit (DSLAM) and at least one decentralised unit (TN1, TN2, TN3) in a communication network. During, for example, the training phase in a decentralised unit (TN1, TN2, TN3), a distance between the at least one decentralised unit (TN1, TN2, TN3) and the central transmission unit (DSLAM) is estimated and a value ($kl_0$) representing said distance is transmitted to the central unit (DSLAM). In the central unit (DSLAM), a value ($kl_0'$) representing a fictional distance is calculated using the transmitted value ($kl_0$) and said value ($kl_0'$) is transmitted to the decentralised unit (TN1, TN2, TN3). Subsequently, information is transmitted in accordance with the value ($kl_0'$) representing the fictional distance.

12 Claims, 1 Drawing Sheet

OTHER PUBLICATIONS

Sigurd Schelstraete: "Defining Upstream Power Backoff for VDSL", IEEE Journal on Selected Areas in Communications, IEEE Service Center, Piscataway, US, vol. 20, No. 5, Jun. 2002.

Krista S. Jacobsen, "Methods of Upstream Power Backoff on Very High Speed Digital Subscriber Lines", XP002441084, IEEE Communications Magazine—Mar. 2001 pp. 210-216.

Sigurd Schelstraete "Defining Upstream Power Backoff for VDSL", IEEE Journal on Selected Areas in Communication, vol. 20, No. 5, Jun. 2002, pp. 1064-1074.

ITU-T, Very high speed digital subscriber line transceivers 2 (VDSL2); Rec. G.993.2; Feb. 2006, pp. 1, 10, 33-39, 147-148.

* cited by examiner

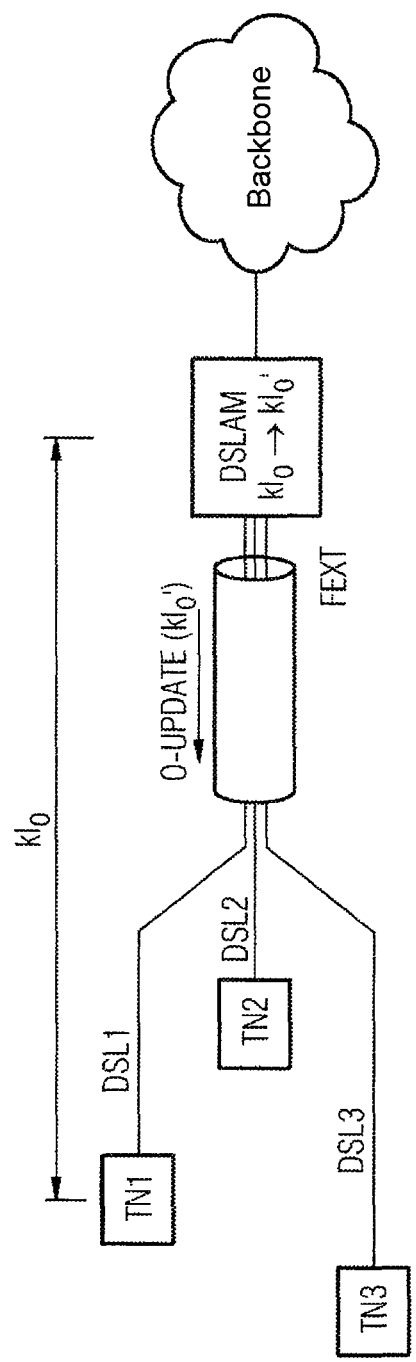

METHOD, ARRANGEMENT AND DEVICE FOR TRANSMITTING INFORMATION BETWEEN A CENTRAL UNIT AND AT LEAST ONE DECENTRALIZED UNIT IN A COMMUNICATION NETWORK

CLAIM FOR PRIORITY

This application is a national stage application of PCT/EP2007/052676, filed Mar. 21, 2007, which claims the benefit of priority to German Application No. 10 2006 015 055.4, filed Mar. 31, 2006, the contents of which hereby incorporated by reference.

TECHNICAL FIELD OF THE INVENTION

The invention relates to a method, an arrangement and a device for transmitting information between a central unit and at least one decentralized unit in a communication network.

BACKGROUND OF THE INVENTION

In current communication networks, the users increasingly desire higher data transmission rates. Transmission methods which can provide high transmission rates also in the subscriber line networks (access networks) of a communication network are, for example, methods which operate in accordance with the xDSL method. Using these transmission methods, the operators of communication networks can also offer their customers broadband connections, for example to the Internet, by means of which the subscribers can use numerous applications in an increasingly more simple and rapid manner. An example of such a data-intensive application for which high transmission rates are needed is, for example, the transmission of video files via the Internet.

Types of embodiments of the abovementioned xDSL method are, for example, the so-called VDSL (very high speed digital subscriber line) method and the VDSL2 method. In this context, transmission rates of 13 MBit/s up to 55 MBit/s are achieved in the downstream (from the switching center to the subscriber) and transmission rates between 1.5 MBit/s and 15 MBit/s are achieved in the upstream (from the subscriber to the switching center) in the case of VDSL on the conventional telephone line between the first switching center on the office side (mostly a so-called DSLAM—digital subscriber line access multiplexer) and subscriber line. With VDSL2, it is even possible to achieve transmission rates of up to 100 MBit/s (downstream and upstream). The information or data are transmitted here in accordance with the so-called frequency division multiplex method, i.e. according to a method in which the frequency bands for downstream and upstream are separated. Thus, for example, two downstream and two upstream frequency bands are in each case basically provided in VDSL which together extend over the frequency spectrum from 135 kHz to 12 MHz. In VDSL2, up to three frequency bands are currently in each case used for downstream and upstream which, in addition to the spectrum utilized with VDSL, are also distributed over the frequencies from 12 MHz to 30 MHz.

The abovementioned physical connection between a subscriber and the switching center (i.e. the conventional telephone line) consists in most cases of a pair of wires, mostly of a twin copper wire. Since several of these subscriber lines can lie combined bundled within a cable, interference and disturbances occur between the wires carried in a cable bundle. These disturbances, or the interfering noises occurring on the lines, become particularly noticeable at the receiver inputs of the transmission system. Such disturbances are also called crosstalk and are frequency-dependent. In addition, a distinction is made here between the so-called near end crosstalk (NEXT) and the far end crosstalk (FEXT).

The near end crosstalk, which is also called transverse attenuation, is a measure of the suppression of the crosstalk between two adjacent pairs of wires at the beginning/end of the cable. The near end crosstalk specifies how strongly the signal of a pair of wires is induced into another pair of wires at the location of the in-feed, that is to say at the transmitter. In contrast, the far end crosstalk relates to the far end of the line, that is to say the receiver end of the transmission link. A signal fed into a wire is reduced by the cable attenuation at the end of the line. The interfering noise which occurs due to crosstalk of this signal to another wire at the receiver end is called far end crosstalk.

In xDSL transmission systems which operate in accordance with the abovementioned frequency division multiplex method (such as, for instance, VDSL2), the disturbances generated by FEXT are essentially determining for a maximum achievable data rate, that is to say for the so-called performance. The performance can be reduced considerably by the FEXT interference noise especially in the VDSL2 transmission technology which, as mentioned above, also uses high frequency bands (up to 30 MHz) for the transmission.

The problem of the FEXT interference noises is additionally increased if the individual subscriber lines have different distances to the office side. If, for example, all subscriber lines were to be supplied with the same transmission power, then shorter lines, that is to say those lines, the subscribers of which are arranged closer to the office side, would have a distinctly higher received signal power at the office side than the signals on longer lines which have been attenuated over a longer distance. These stronger signal powers on shorter subscriber lines would greatly interfere with weaker signals on longer subscriber lines which would lead to greatly different performances of the individual subscriber lines.

To solve this problem, the possibility of the so-called "upstream power back-off" (UPBO) is provided in ITU standard G.993.2, chapter 7.2.1.3 and in ITU G.997.1. Using the UPBO mechanism, the upstream transmission power is controlled in such a manner that all upstream signals have signal levels that are as similar as possible at the receiving side. This ensures that all subscribers can be provided approximately with a similar data rate on the corresponding subscriber line. The UPBO improves the spectral compatibility of the subscriber lines.

To carry out the UPBO mechanism, the steps explained in the text which follows are carried out during a training phase when setting up the connection. At the beginning of the training, the transmission unit at the office side (DSLAM) conveys to the subscriber unit predeterminable standard signals. These can contain, for example, information about the signal power with which these signals were sent out and also specifications with respect to the power with which upstream signals sent from the subscriber should arrive at the DSLAM. By means of this information, the subscriber unit determines in a first step line parameters of the communication link. In this context, for example, the signal strength of the received signals is detected and, by means of the information about the original transmission power of the signals, the attenuation within the subscriber line and, respectively, a corresponding value for the electrical length of the line (usually designated as $kl_0$), is estimated. Using this knowledge, the transmission power can be established in the subscriber unit in such a manner that the signals should reach the office side as accurately as possible with the power required by the DSLAM. Values for this required received power can be predetermined by the operator of the communication network, for example via network management settings. At the end of the training phase, the value representing the transmission power is finally also transmitted from the subscriber unit to the DSLAM.

As described above, the UPBO mechanism attempts to place the received power of all subscriber lines on an as similar as possible a value in order to obtain the least possible effects due to FEXT interference. However, this concept overlooks the fact that subscribers with shorter subscriber lines can easily operate with a comparatively somewhat higher transmission power (and thus have a higher received power and better performance) without causing additional FEXT interference on the comparatively longer subscriber lines: since the interference caused by FEXT at the end of a line is also dependent on the total length of the subscriber line previously to be bridged, subscriber units with shorter distance from the office side can actually transmit with higher power without exceeding the permitted limit of generated FEXT interference. A higher transmission power on the subscriber side alone does not automatically generate FEXT interference which is too great at the office side on short subscriber lines; due to the shortness of the line (i.e. greater FEXT attenuation, less crosstalk), such FEXT interference is no stronger, even with higher transmission power, than, for example, in the case of lower transmission powers on longer subscriber lines.

To achieve a higher performance for individual subscribers (for those who are located closer to the office side), their transmission power can therefore be raised to a higher level without other subscribers being disturbed beyond the permitted extent.

(A further possibility would be, for instance, not to increase the transmission power of the shorter subscriber lines but to utilize the resultant better performance of the longer subscriber lines. Thus, for example, the possibility would exist that, when considering the DSLAM subscriber loop as a whole, the performance can be increased balanced for all subscribers instead of improving the performance for individual subscriber lines.)

For the case considered above that the subscribers who are closer with respect to the office side operate with higher transmission power and thus obtain a better performance, however, there is one problem: such an increase in transmission power for individual subscriber lines is not provided in the standards quoted above and particularly the calculations according to the standards, described in greater detail below, of the transmission power in the individual subscriber units.

SUMMARY OF THE INVENTION

The invention relates to methods for transmitting information between a central unit and at least one decentralized unit in a communication network and, for example, to increase the performance of the methods.

In one embodiment according to the invention for transmitting information between a central unit and at least one decentralized unit in a communication network, a value representing a distance between the central unit and the at least one decentralized unit is detected in the at least one decentralized unit and this value is transmitted to the central unit. In one aspect of the invention, a value represents a fictitious distance between the central unit and the at least one decentralized unit is determined in the central unit by means of the value representing the distance, this former value is transmitted to the at least one decentralized unit and the information is transmitted in dependence on the value representing the fictitious distance.

One advantage of the method according to the invention includes, among other things, individual subscriber units that can achieve a higher transmission power, and thus a better performance, without changes having to be performed at the subscriber units themselves.

Advantageously, a spectral variation of the transmission power density is determined in the decentralized unit by means of the transmitted value representing the fictitious distance and the information is transmitted in dependence on the spectral variation of the transmission power density. This can take place as part of the normal standard-compliant procedures for setting up a connection.

The detection of the value representing the distance and the transmission of the value representing the distance advantageously take place within a training phase. By this means, the connection settings can be established already when a connection is set up.

The detection of the value representing the distance, the transmission of the value representing the distance, the determination of the value representing the fictitious distance and the transmission of the value representing the fictitious distance can also advantageously take place during a training phase. This improves the actual training phase and thus makes it possible to establish optimized connection settings even before the actual establishment of the connection.

BRIEF DESCRIPTION OF THE INVENTION

In the text which follows, the method according to the invention is explained in greater detail with the aid of the attached drawing, in which:

FIG. 1 shows the basic structure of a subscriber line network (access network).

DETAILED DESCRIPTION OF THE INVENTION

FIG. 1 shows the basic structure of a subscriber line network (access network). Three subscribers (TN1, TN2, TN3) of the communication system are connected via their respective subscriber lines (DSL1, DSL2, DSL3) to the office side. The first unit at the office side is a DSLAM. This collects the information or data of the individual subscriber lines and forwards them into the main network of the communication system. This main network ("backbone") can be, for example, an IP network.

The three subscriber lines (DSL1, DSL2, DSL3) have a different length, that is are arranged at a different distance from the DSLAM. Possible lengths of the individual lines would be, e.g., 700 m for DSL1, 400 m for DSL2 and 1000 m for DSL3. As can be seen in FIG. 1, a part (the section of the lines at the office side) is in each case combined in a common cable bundle. Within this cable, the abovementioned effect of crosstalk therefore occurs. The three subscriber lines (DSL1, DSL2, DSL3) interfere with one another.

During the training phase which is obligatory when setting up a connection, i.e. the adjustment or configuring of the connection parameters between DSLAM and a subscriber (TN1, TN2 or TN3), the steps described in the text which follows will be executed, among other things. It is then assumed, for example, that a connection according to the VDSL method is set up between the transmission unit at the office side (DSLAM) and, in the present example, the subscriber TN1.

At the beginning, test signals are transmitted with a certain power intensity to the subscriber unit TN1 from the DSLAM according to the ITU standards G.993.2 and G.997.1 for organizing the UPBO mechanism, as explained above. Among other things, information is also transmitted about the power intensity with which the signals sent by the subscriber unit are to reach the DSLAM.

On the basis of these parameters and the signal strength of the received signals, detected at the subscriber line, an electrical length of the connection ($kl_0$) which is valid for the corresponding subscriber line is then estimated in the subscriber unit (TN1). By means of this estimated value for the distance between subscriber unit and transmission unit at the office side, the so-called UPBO transmission mask is usually determined by means of the following formula (1) according to ITU G.993.2 and G.997.1, respectively:

$$\text{UPBOMASK}(kl_0, f) = \text{UPBOPSD}(f) + \text{LOSS}(kl_0, f) + 3.5 \text{ [dBm/Hz]} \quad (1)$$

where LOSS($kl_0$,f) and UPBOPSD(f) are defined as follows:

$$\text{LOSS}(kl_0, f) = kl_0 * \sqrt{f} \quad (2)$$

$$\text{UPBOPSD}(f) = -a - b * \sqrt{f} \text{[dBm/Hz]}, \text{ with } f \text{ in MHz} \quad (3)$$

In a further step, the estimated electrical length ($kl_0$) is transmitted from the subscriber unit to the DSLAM.

As described in the introduction to the description, the abovementioned formula for adjusting the UPBO transmission mask, and thus for the transmission power of the subscriber unit, is not optimized, however. Subscriber units having shorter subscriber lines can send with a higher transmission power in comparison with the above formula without disadvantages being incurred by other subscribers as a result.

The formula for the UPBO transmission mask can therefore be modified as follows:

$$\text{UPBOMASK}(kl_0, f) = \text{UPBOPSD}(f) + \text{LOSS}(kl_0, f) + 3.5 + \text{FEXT\_correction [dBm/Hz]} \quad (4)$$

The additional parameter "FEXT_correction" is thus a correction parameter for improving the signal power, which is not optimally calculated for compensating for the FEXT interference according to the original formula. In this context, FEXT_correction can be dependent on the electrical length $kl_0$ and on the frequency. Values for FEXT_correction can be registered, for example, by empirically acquired data. Furthermore, a function for the corresponding values of the respective FEXT_correction can also be derived or approximated, for example, from such data.

According to the invention, the optimized formula (4) for determining the transmission mask for the subscriber line TN1 is used in the central unit (DSLAM) on the office side. This has the advantage that this extended formula only needs to be known in the central unit; i.e. when the optimized (currently non-standardized) formula is used, the calculation algorithm only needs to be changed in the central unit. The individual subscriber units can remain unchanged which means a distinct reduction in configuration complexity.

Using the optimized formula (4) for determining the transmission mask, a fictitious second value ($kl_0'$) representing the distance between subscriber unit (TN1) and DSLAM is now calculated in the DSLAM. This value ($kl_0'$) specifies that distance from the office side (DSLAM) which the subscriber unit TN1 would have to have in order to transmit with the new optimized transmission power, previously determined in the DSLAM—with a calculation according to the original formula (1).

This fictitious distance value ($kl_0'$) is then conveyed to the subscriber unit TN1. For this purpose, the command "O-UPDATE" provided in ITU standards G.993.2 and G.997.1 is used (see chapter 12.3.3.2.1.2 in G.993.2). This command enables the transmission unit at the office side to predetermine a particular distance value for the decentralized subscriber unit (TN1).

Directly following the standardized training phase, the "O-UPDATE" command is thus used even before the actual initialization of the connection in order to transmit the fictitious distance ($kl_0'$) determined by the DSLAM to the subscriber line TN1.

Finally, the transmitted value of $kl_0'$ is used in the subscriber line TN1 for recalculating the transmission mask. In the subscriber line unit TN1, the fictitious distance $kl_0'$ is thus used for achieving the increased transmission power and, respectively, the optimized spectral variation of the transmission power density by using the original formula (1) still valid in TN1.

It would also be conceivable that, for example, the DSLAM itself calculates the new higher transmission power and transmits it directly to the subscriber units (TN1).

The procedure according to the invention has the advantage that, on the one hand, a command or process already implemented in the units involved is used and that, on the other hand, both the transmission of the value for the distance and the prescribing of a certain (the optimized) value can additionally take place in compliance with the standard. Thus, all standard-compliant subscriber line units (TN1, TN2, TN3) can still be used without changes.

The method according to the invention does not require, for example, any software update in the subscriber units (TN1, TN2, TN3). A software update would be a possibility which could be utilized, for example, for implementing the optimized formula for calculating the transmission mask in the subscriber units (TN1, TN2, TN3). However, this would lead to the individual units (TN1, TN2, TN3) no longer operating in accordance with the quoted standards, i.e. to them no longer being able to operate together with conventional central transmission units (DSLAM).

In addition, there are problems when subscriber units which operate according to the standard and subscriber units which operate with the optimized formula are jointly connected to a DSLAM. Such disadvantages are eliminated by the method according to the invention.

A further advantage of the method according to the invention is the less complex possibility of changing configuration settings. If, for example, the operator of a communication network were to carry out changes with respect to transmission power, volume of data or similar, such changes only need to be carried out on the office side (in the DSLAM). The subscriber units remain completely unaffected by this.

The invention claimed is:

1. A method for transmitting information between a central unit and at least one decentralized unit in a communication network, comprising:

detecting, in the at least one decentralized unit, a value representing a distance between the central unit and the at least one decentralized unit;

transmitting the value to the central unit;

determining, in the central unit, a second value representing a fictitious distance between the central unit and the at least one decentralized unit by means of the value representing the distance, the fictitious distance specifying a distance between the central unit and the at least one decentralized unit that would result in a transmission with optimized transmission power;

transmitting the second value to the at least one decentralized unit; and transmitting the information based on the second value representing the fictitious distance.

2. The method as claimed in claim 1, further comprising determining a spectral variation of the transmission power density in the decentralized unit by means of the transmitted second value representing the fictitious distance; and transmitting the information based on the spectral variation of the transmission power density.

3. The method as claimed in claim 1, wherein the detection of the value representing the distance and the transmission of the value representing the distance take place within a training phase.

4. The method as claimed in claim 1, wherein the detection of the value representing the distance, the transmission of the value representing the distance, the determination of the second value representing the fictitious distance and the transmission of the second value representing the fictitious distance take place during a training phase.

5. The method as claimed in claim 1, wherein the value representing the distance is derived from an attenuation occurring during the transmission of the information.

6. The method as claimed in claim 1, wherein information is transmitted according to an xDSL method.

7. The method as claimed in claim 1, wherein information is transmitted in accordance with the VDSL or VDSL2 method.

8. The method as claimed in claim 1, wherein the transmission of information and/or the training phase take place in accordance with ITU standards G.993.2 and/or G.997.1.

9. The method as claimed in claim 8, wherein the second value representing the transmission power is transmitted to the at least one decentralized by means of the "O-UPDATE" command.

10. An arrangement for transmitting information between a central unit and at least one decentralized unit in a communication network, comprising:
the at least one decentralized unit includes
a device for detecting a value representing a distance between the central unit and the at least one decentralized unit, and
a device for transmitting the detected value to the central unit, and
the central unit including
a device for determining a second value representing a fictitious distance between the central unit and the at least one decentralized unit by means of the value representing the distance, the fictitious distance specifying a distance between the central unit and the at least one decentralized unit that would result in a transmission with optimized transmission power, and
a device for transmitting the second value representing the fictitious distance to the at least one decentralized unit, and
wherein the information is transmitted between the central unit and the at least one decentralized unit based on the second value representing the fictitious distance.

11. The arrangement as claimed in claim 10, wherein, in the decentralized unit, a device is provided for determining a spectral variation of the transmission power density by means of the transmitted second value representing the fictitious distance, and the information is transmitted between the central unit and the at least one decentralized unit based on the spectral variation of the transmission power density.

12. A central unit for an arrangement for transmitting information between the central unit and at least one decentralized unit in a communication network, the central unit comprising:
a device for receiving a value transmitted by the at least one decentralized unit and representing a distance between the central unit and the at least one decentralized unit,
a device for determining a second value representing a fictitious distance between the central unit and the at least one decentralized unit by means of the value representing the distance, the fictitious distance specifying a distance between the central unit and the at least one decentralized unit that would result in a transmission with optimized transmission power,
a device for transmitting the second value representing the fictitious distance to the at least one decentralized unit, and
a device for transmitting the information between the central unit and the at least one decentralized unit in the communication network, the device configured such that the information is transmitted based on the second value representing the fictitious distance.

* * * * *